V. CALANDRA.
BUDDING IMPLEMENT.
APPLICATION FILED MAR. 24, 1920.
1,423,491.
Patented July 18, 1922.
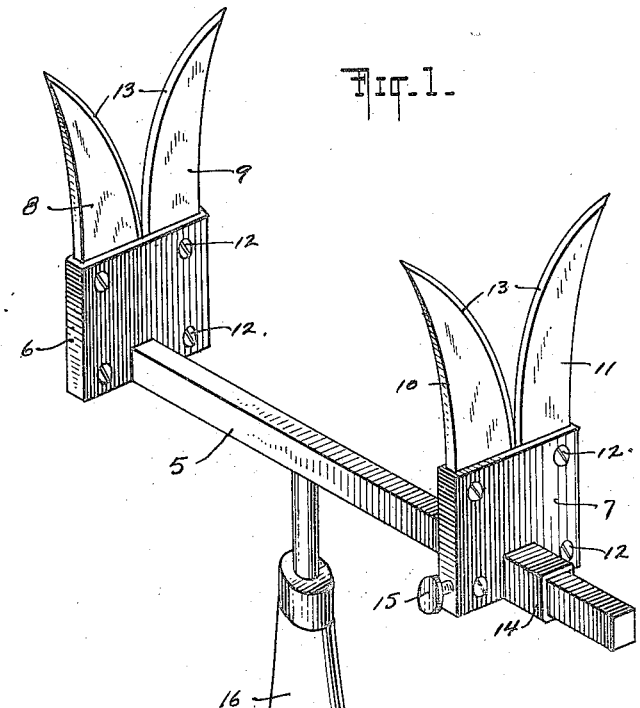
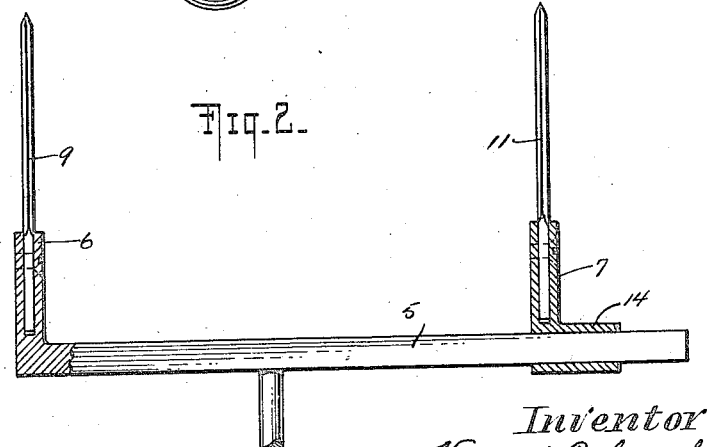
Inventor
Vincent Calandra
By J. Wm Ellis
Attorney

UNITED STATES PATENT OFFICE.

VINCENT CALANDRA, OF BUFFALO, NEW YORK.

BUDDING IMPLEMENT.

1,423,491.  Specification of Letters Patent.  Patented July 18, 1922.

Application filed March 24, 1920. Serial No. 368,277.

*To all whom it may concern:*

Be it known that I, VINCENT CALANDRA, a citizen of the United States, and a resident of the city of Buffalo, county of Erie, and State of New York, have invented certain new and useful Improvements in Budding Implements, of which the following is a full, clear, and exact description.

My invention relates generally to an implement for use in budding an eye from a choice variety of fruit onto a hardy or common variety.

As is well known to those skilled in the art, in the operation of budding it is usual to remove the bark from the tree or vine to be budded, and then to remove a similar piece of bark from a limb or vine bearing a better variety of fruit. It is desirable to have the piece of bark, which is to be budded onto the tree or vine, of the same size as the piece previously cut from the tree to be budded.

The principal object of my invention has been to provide a budding implement provided with a pair of cutting blades, by which the piece of bark to be removed may be cut at both ends at the same time.

Another object has been to provide such a device which is adjustable so that the length of bark cut by the implement may be varied at will.

The above objects and advantages have been accomplished by the device shown in the accompanying drawings, of which:

Fig. 1 is a perspective view of my complete device, slightly enlarged for clearness of illustration.

Fig. 2 is a longitudinal, sectional view of the same.

The device comprises an adjusting bar 5, which carries at one end, a stationary knife holder 6, and at the other end a movable knife holder 7. The adjusting bar is preferably square in cross-section, and the knife holders are arranged at right-angles thereto. The stationary holder 6 is provided with two knives 8 and 9; and the adjustable knife holder 7 is also provided with two knives 10 and 11. The knives 8, 9, 10 and 11 are secured in the holders preferably by means of screws 12, and their free ends are flared outwardly, as shown. The inner edges 13 of the knives are the cutting edges and are suitably sharpened.

The adjustable blade holder 7 is preferably provided with a boss 14, integral with the holder and slidable with it over the square-shaped adjusting bar 5. A set screw 15 is provided on the adjustable head 7, whereby the holder and the knives carried by it may be set at any predetermined distance from the knives of the stationary head 6.

16 is a handle, which is secured to the adjusting rod 5 and preferably at right-angles thereto.

When the device is to be used, the adjustable head 7 is set at the desired distance from the head 6, so as to cut the required length of the bark, and the device is then placed with the cutting edges of each pair of knives straddling the limb or vine to be budded. By rotating the device about the limb or vine, and exerting a light pressure against it, the bark will be cut at both ends at the same time. The device is then used, without altering the adjustment, to cut a piece of bark bearing an eye from the limb or vine from which the bud is to be taken.

Having thus described my invention, what I claim is:

1. A budding implement characterized by having a rigid bar, stationary cutting blades rigidly mounted at one end of the bar, adjustable cutting blades slidably mounted upon the opposite end of the bar, and means for locking the adjustable blades in position.

2. A budding implement characterized by having a rigid bar, a pair of stationary cutting blades rigidly carried at one end of the bar, a pair of adjustable cutting blades slidably mounted upon the opposite end of the bar, the cutting edges of each pair of blades being mounted in the same plane and having their cutting edges facing each other, and means for locking the pair of adjustable blades in position.

3. A budding implement characterized by having a handle, a rigid bar carried by the handle and mounted at right angles thereto, a pair of stationary cutting blades rigidly carried at one end of the bar, a pair of adjustable cutting blades slidably mounted upon the opposite end of the bar, the cutting edges of each pair of blades being mounted in the same plane and having their cutting edges facing each other, and means for locking the pair of adjustable blades in position.

4. A budding implement characterized by having a rigid bar, a stationary knife holder rigidly mounted at one end of the bar, an adjustable knife holder slidably mounted upon the bar at its opposite end, a pair of cutting knives removably mounted in each of the knife holders, the cutting edges of each pair of blades being arranged in the same plane and having their cutting edges facing each other, and means for locking the adjustable knife holders in position on the bar.

In testimony whereof I have hereunto signed my name.

VINCENT CALANDRA.